US008273441B2

(12) United States Patent
Deaton

(10) Patent No.: US 8,273,441 B2
(45) Date of Patent: Sep. 25, 2012

(54) GARAGE DOOR DISPLAY AND DECORATIVE ARTICLE

(76) Inventor: Suzanne M. Deaton, Waterford, WI (US)

( * ) Notice: Subject to any disclaimer, the term of this patent is extended or adjusted under 35 U.S.C. 154(b) by 515 days.

(21) Appl. No.: 12/508,568

(22) Filed: Jul. 24, 2009

(65) Prior Publication Data

US 2011/0020614 A1 Jan. 27, 2011

(51) Int. Cl.
*B32B 3/26* (2006.01)

(52) U.S. Cl. .................... 428/99; 428/195.1; 428/314.4; 428/692.1; 428/900; 40/600

(58) Field of Classification Search ............... 428/195.1, 428/314.4, 99, 900, 692.1; 40/600
See application file for complete search history.

(56) References Cited

U.S. PATENT DOCUMENTS 2,749,640 A * 6/1956 Scott .............................. 428/43
5,004,649 A 4/1991 Yamasaki et al.
D497,323 S 10/2004 Novak
2001/0008702 A1 7/2001 Vela
2002/0157294 A1 10/2002 Stanley
2005/0076591 A1 * 4/2005 Koeller ........................ 52/311.1
2007/0273823 A1 11/2007 Lee et al.

OTHER PUBLICATIONS http://www.kjmagnetics.com/blog.asp?p=sticky-business-how-to-glue-neodymum-magnets.*
"Magnetic Holiday Garage Door Decorations Letters, Numbers Decorate" http://outdoorfurniturerepairrefinish.vox.com/library/post/magnetic-holiday-garage-door-decorations-letters-numbers-decorate-transform-your-garage-door.html, Jul. 23, 2009.
"Holiday Garage Door Magnets" http://www.funstix.net/, Jul. 23, 2009.
"Dec a Door Magnetic Garage Door Decorations" http://www.thegaragecollage.com/product_info.php?cPath=28&products_id=51, Jul. 23, 2009.

* cited by examiner

*Primary Examiner* — Gerard Higgins
*Assistant Examiner* — Christopher Polley
(74) *Attorney, Agent, or Firm* — Rathe Lindenbaum LLP

(57) ABSTRACT

A garage door display and decorative article include a first closed cell foam layer having a thickness of at least 0.1 inches having a front face and a rear face. A rare earth metal magnet is fused to previously melted and presently solidified portions of the first closed cell foam layer on the rear face. A decorative piece is fused to previously melted and presently solidified portions of the first closed cell foam layer on the front face.

19 Claims, 3 Drawing Sheets

GARAGE DOOR DISPLAY AND DECORATIVE ARTICLE

BACKGROUND

It is sometimes desirable to decorate one's residence so as to celebrate a holiday, a birthday or a special event. Although a garage door provides a large surface, decorating a garage door is challenging as it is undesirable to permanently alter the garage door and reliably, but releasably, securing decorative articles to the garage door is difficult as the decorative articles are exposed to the weather and the elements.

BRIEF DESCRIPTION OF THE DRAWINGS

1 is a front plan view of a garage door display according to an example embodiment.

DETAILED DESCRIPTION OF THE EXAMPLE EMBODIMENTS

Figure 1:
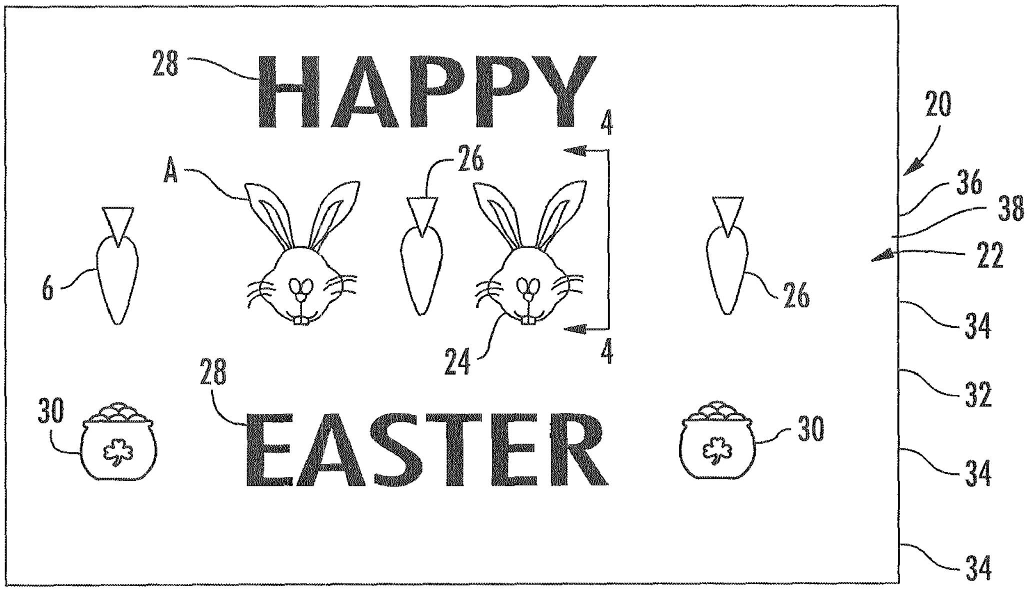

FIG. 1 illustrates a garage door display 20 according to an example embodiment. Garage door display 20 includes a metallic garage door 22 and at least one decorative article. In the example illustrated, garage door display 20 includes decorative articles 24, 26, 28 and 30. As will be described hereafter, decorative articles 24-30 may be easily mounted to and removed from garage door 22. At the same time, the configuration of decorative articles 24 allows decorative articles 24 and 30 to each individually provide a three-dimensional garage door decoration that is magnetically secured to the garage door in a reliable fashion despite peaks and valleys in the surface of the garage door 22 and despite being potentially exposed to wind and rain.

Garage door 22 comprises a metallic door having a magnetically attractable layer or surface 32. For purposes of this disclosure, the term "magnetically attractable" means that a magnet will be attracted to the layer or surface. In one embodiment, surface 32 may be formed from aluminum. In other embodiments, surface 32 may be formed from steel or other metals. In some embodiments, the magnetically attractable surface 32 may be coated with a thin non-magnetic polymer or other material, wherein the articles 24-30 are still attracted to and held by the underlying magnetically attractable surface 32.

As further shown by FIG. 1, door 22 includes a plurality of sections 34 which pivot relative to one another during retraction of the grudge door 22. Each section 34 includes a multitude of peaks and valleys. In particular, each section 34 includes a V-shaped groove or depression 36 surrounding a plateau 38. In other embodiments, each section 34 may include other shapes and configurations as well as other layouts of surface irregularities or patterned depressions.

Decorative articles 24-34 form the overall decorative display on garage door 22. As shown by FIG. 1, articles 24 and 26 form a pattern of decorative articles. Articles 28 comprise individual letters which collectively form words. Articles 30 book end the words. In the example illustrated, articles 24-30 provide a display decorated for two closely timed holidays, Easter and St. Patrick's Day. In other embodiments, articles 24-30 may alternatively be used to decorate garage door 22 for other holidays, birthdays, anniversaries, graduations or other special events. As such, articles 24-30 may form words or form shapes corresponding to holiday or special event associated items. Examples of such items include Christmas trees, Menorahs, snowmen, Easter eggs, pumpkins, witch hats, witch brooms, ghosts, a Santa Claus, a wreath, a diploma, a graduation hat, a birthday cake, an American flag, a turkey, a football helmet, a football and the like. Articles 24-30 may have other shapes so as to serve as a promotion or advertisement for an event such as a garage sale or the like. Because at least some of articles 24 individually provide a three-dimensional decoration, the display provided by article 24 is more visually appealing and attractive.

Figure 2:
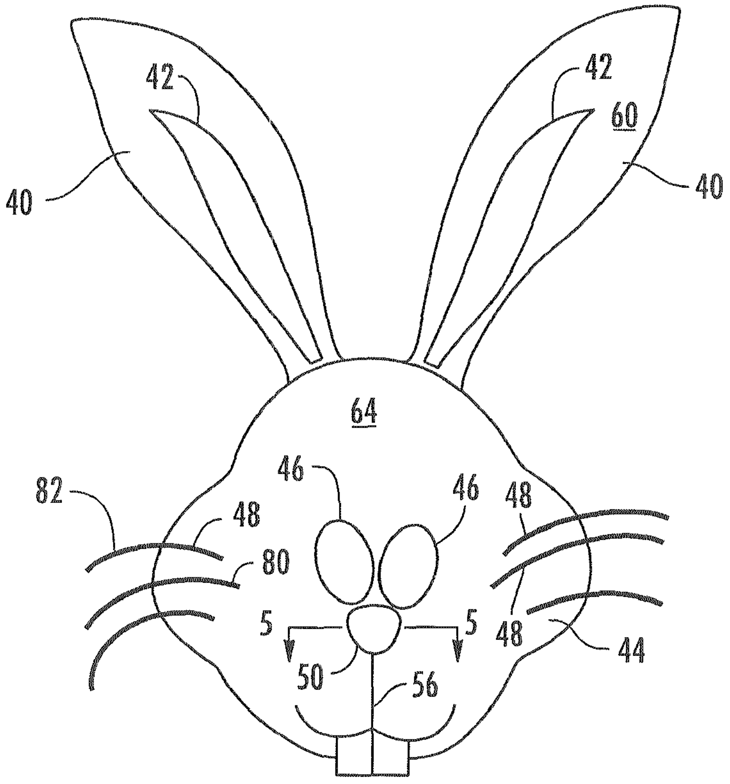
FIG. 2 is a front plan view of a first decorative article of the display of FIG. 1 according to an example embodiment.
Figure 3:
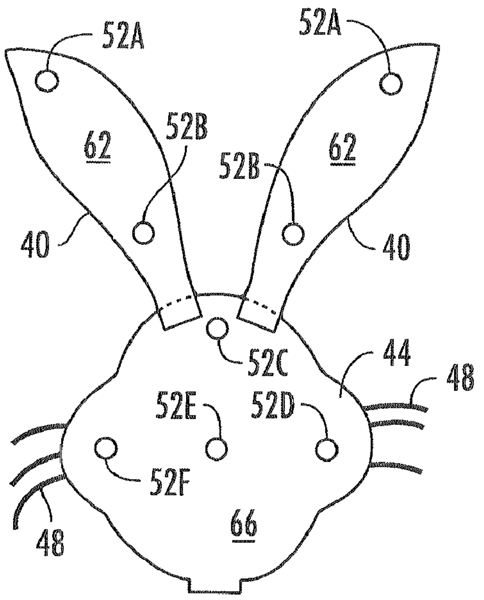
FIG. 3 is a rear plan view of the first decorative article of the display of FIG. 1 according to an example embodiment.
Figure 4:
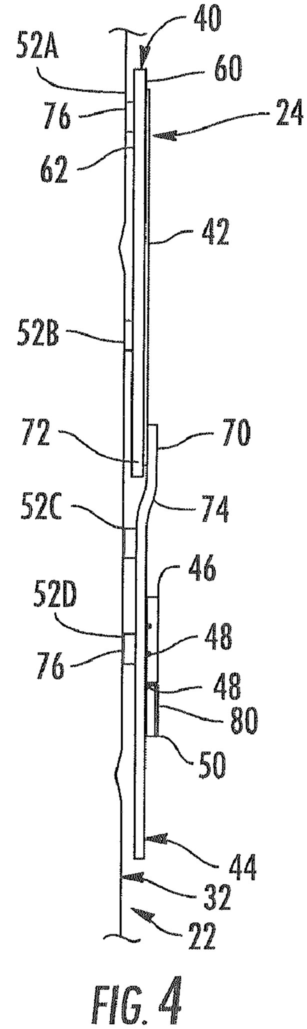
FIG. 4 is a fragmentary sectional view of the display of FIG. 1 taken along line 4-4 of FIG. 1.
Figure 5:
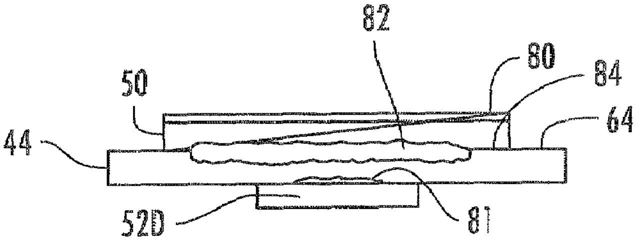
FIG. 5 is a sectional view of the article of FIG. 2 taken along line 5-5.

FIGS. 2-5 illustrate one of articles 24 in more detail. FIG. 2 is a front plan view of article 24. FIG. 3 is a rear plan view of article 24. FIG. 4 is a sectional view of article 24 mounted on surface 32 of garage door 22. FIG. 5 is an enlarged sectional view of a portion of article 24. In the example embodiment, article 24 has the shape of a rabbit or Easter Bunny. In other embodiments, article 24 may have other shapes representing other items. In the example illustrated, article 24 has a surface area of at least 20 inches, facilitating its viewing on garage door 22 from a distance at which garage door 22 is normally observed. Aspects to particularly note with respect to article 24 include not the particular shape of the pieces forming article 24 or the overall particular shape provided by the pieces, but how the pieces are arranged and joined to one another to form a three-dimensional decoration capable of withstanding outdoor elements and how the pieces and their associated magnets provide a more secure and reliable amount of article 24 to a garage door.

As shown by FIG. 4, article 24 provides a three-dimensional decoration not only having a length and a width, but also having a depth. In particular, article 24 is composed of multiple layers or pieces stacked upon one another to achieve a three-dimensional decoration. Many of the stacked layers have a thickness of at least 1/10 of an inch and nominally at least about 1/8 of an inch to provide a visually discernible change in depth or elevation given the normal distance at which an observer would be distance from the front of garage door 22.

In the example illustrated, article 24 includes decorative pieces 40, 42, 46, 48, and 50 and rare earth metal magnets 52A-52F (collectively referred to as magnets 52). Article 24 additionally includes markings 56 written, stamped or otherwise formed upon decorative piece 44. Decorative pieces 40 and 42 form the ears of the example rabbit or Easter Bunny depicted. Decorative pieces 40 each comprises a layer of closed cell foam having a front face 60, a rear face 62 (shown in FIG. 3) and a thickness of at least about 1/10 of an inch. Decorative pieces 42 comprise layers of visually distinct material, such as a shiny or reflective material, adhered by an adhesive to the front face 62. In other embodiments, decorative pieces 42 may be omitted.

Decorative piece 44 comprises a layer of closed cell foam having a front face 64 (shown in FIG. 2), a rear face 66 (shown in FIG. 3) and a thickness of at least 1/10 of an inch. In the example illustrated, decorative piece 44 has a shape corresponding to a head of the rabbit or Easter Bunny. As shown by FIG. 4, piece 44 has a portion 70 that overlaps an underlying portion 72 of piece 40. In the example illustrated, portion 70 and 72 are bonded, fused, adhered (by an adhesive) or welded to one another. In the example illustrated, portion 70 and portion 72 are welded to one another to provide a more reliable connection believed to be better capable of withstanding wind and other weather elements.

For purposes of this disclosure, the term "welded" or "welding" refers to portions of two adjacent or proximate layers having been melted, wherein materials of the two layers may mix or comingle while melted and wherein the melted and mixed materials solidify to form more of a integral composite structure. Such welding may be facilitated by an intermediate welding additive which, when melted, mixes with the melted materials of the first layer and the second layer. When a welding additive is employed, melted materials of the first layer and the second layer may not necessarily mix directly with one another, but each mixes with the intermediate welding additive.

As further shown by FIG. 4, because portion 70 overlaps portion 72 and is stacked upon the underlying portion 72, the front face of piece 40 as well as the front of piece 42 is recessed or depressed from the front face 64 of piece 44 by distance to substantially equal to the thickness of the closed cell foam layer forming piece 44. Because the closed cell foam layer forming piece 44 has a thickness of at least 1/10 of an inch, and nominally at least about 1/8 of an inch, this change in levels is visibly significant, providing article 24 with a more three-dimensional appearance.

At the same time, the closed cell foam layer forming piece 44 is sufficiently flexible or bendable such that portion 74 of piece 44 flexes or bands such that magnets 52C and 52D (joined to piece 44) have magnet faces 76 which extend in substantially the same plane as magnets 52A, 52B (joined to piece 40) when article 24 secured to garage door 22. Because faces 76 extend in a same plane, article 24 may be more securely and reliably magnetically held along surface 32 of garage door 22. Although not shown in FIG. 4, the flexible or bendable nature of the compressible closed cell foam layer forming piece 44 also enables piece 40 or piece 44 to bend or blacks to a degree sufficient such that one or more of magnets 52 may be located in a different plane with respect to one another while still being joined or in direct contact with surface 32 of garage door 22. For example, piece 44 may additionally bend such that one of magnets 52 is located within a depression or groove extending in surface 32 of door 22.

Pieces 46 comprise additional pieces joined or coupled to front face 64 of piece 44. In the illustrated example, pieces 46 have shapes and locations corresponding to eyes of the rabbit or Easter Bunny. According to one embodiment, pieces 46 comprise layers of non-closed cell foam material, such as solid polymeric discs. In such an embodiment, pieces 46 are either adhered to (using an adhesive) or fused to face 64. For purposes of this disclosure, the term "fused" refers to two adjacent layers, wherein only one of the layers is melted while in contact with the other of the layers and wherein the melted layer subsequently solidifies to adhere to the unmelted layer. In some embodiments, fusing the layers or pieces may be facilitated by a fusing additive which is also in a melted state and mixes with the melted layer, wherein the fusing additive or the mixture of the fusing additive and the melted layer solidified adjacent the unmelted layer to join the unmelted layer, such as piece 46, to the previously melted layer (piece 44). In other embodiments, pieces 46 may comprise layers of closed cell foam material welded to piece 44.

Pieces 48 comprise layers of one or more materials which are joined to piece 44 at one end and which project or extend from piece 44 so as to be cantilevered from piece 44. In the example illustrated, pieces 48 comprise elongate polymeric or plastic strings or strands representing whiskers of the rabbit or Easter Bunny. Each piece 48 has a first portion 80 welded or fused to face 64 of piece 44 and a second portion 82 extending beyond and cantilevered with respect to piece 44. Because pieces 48 are fused or welded to piece 44, they are less likely to become detached from piece 44 even when exposed to outside elements.

Piece 50 comprises a layer of closed cell foam. In this example illustrated, piece 50 additionally includes a front coating or laminate 80 which is shiny or reflective. In other embodiment, coating or laminate 80 may be omitted. In the example illustrated, piece 50 has a shape and location corresponding to the nose of the rabbit or Easter Bunny.

In embodiments where piece 50 comprises a layer of closed cell foam, piece 50 is welded to piece 44. As a result, piece 50 is more reliably and securely joined to piece 44 and is more resistant to wind, rain and other outdoor elements. In other embodiments, piece 50 may be joined to piece 44 in other manners.

Rare earth magnets 52 comprise relatively small magnets formed from rare earth material such as neodymium (NdFeB). Magnets 52 have a diameter of less than or equal to about 1 inch and a thickness of less than or equal to about 3/8. In the example illustrated, magnets 52 each have a diameter under a less than or equal to about 6 mm and a thickness of less than or equal to about 1.5 mm. Because magnets 52 have a thickness of less than about 1.5 mm (1/16 of an inch), magnets 52 allow article 24 to be held in relatively close proximity to surface 32 of garage door 22 (less than or equal to about 1.5 mm from surface 32). At the same time, although small, magnets 52 have a relatively large holding or pull force. In the example illustrated, magnets 52 are formed from neodymium (NdFeB), have a diameter of 6 mm (1/4 inch), a thickness of 1.5 mm (1/16 inch) and a pull force of approximately 2.88 pounds. As a result, each of magnets 52 provide a dense attractive force, magnets 52 or reliably and securely hold and return in article 24 against surface 32 of garage door 22 as compared to magnetic coatings or laminates. This additional holding force may be the difference between article 24 remaining stationary or article 24 becoming detached from or sliding along surface 32 in wind or during movement of garage door 22 such as when garage door 22 is raised and lowered.

Moreover, because the holding force is condensed at a few spaced locations along article 24, rather than being coated or laminated across a majority of article 24, only magnets 52 need to be brought into actual contact with garage door 22 and intermediate portions of article 24 may be spaced from and not in contact with garage door 22. In other words, with magnetic laminates or coatings, the full holding force of the magnetic laminate or coating is only achieved when all of the magnetic laminate or coating is in contact with the metal surface. However, because garage door 22 includes multiple depressions and surface irregularities, the full holding force of such a magnetic laminate or coating could not be achieved. In contrast, magnets 52 permit portions of article 24 to be out of contact opposite portions of garage door 22 without sacrificing the holding force securing article 24 to the garage door 22. Thus, magnets 52 facilitate more reliable securement of article 24 against an irregular surface, such as surface 32 of garage door 22.

As noted above, the density of the magnetic holding force provided by magnets 52 more securely holds article 24 against the regular surface 32 of garage door 22. However, because magnets 52 are relatively dense (in terms of both magnetic force and mass or weight), magnets 52 create points of high stress at the juncture of magnets 52 and a remainder of article 24. In particular, the mass or weight of each of magnets 52 is not spread out across a large surface area of article 24, but must be supported by a relatively small juncture between each magnets 52 and the back of piece 44. In addition, all forces encountered by article 24 during exposure to outdoor elements, such as wind, will be transmitted across the relatively small juncture between each of magnets 52 and pieces 40 or 44. To accommodate such high forces, magnets 52 are not merely adhered with an adhesive to pieces 40 and 44, but are instead fused to pieces 40 and 44. As a result, pieces 40 and 44 less likely to become separated from magnets 52 during exposure to wind or other outdoor elements.

FIG. 5 illustrates in more detail the joining of piece 44 to magnets 52D and to piece 50. As shown by FIG. 5, magnet 52D is fused to rear face 66 of piece 44. In other words, magnet 52 is fused to previously melted and presently solidified portions of rear face 66 of piece 44. In the example illustrated, a fusing additive 81 is provided between magnets 52D and rear face 66 of piece 44. The fusing additive 81 comprises a melted material which is at a sufficiently high temperature to also melt the closed cell foam material of piece 44. As a result, the fusing additive and the close cell foam material mix. During this process, heat provided by the melted fusing additive is further conducted and distribute by a metallic material of magnets 52D. Because magnet 52D is mostly metallic (greater than 80% metallic) and has a high degree of thermal conductivity, substantially an entirety of the surface of piece 44 opposite to magnet 52D is uniformly heated and melted. Upon solidification of the melted fusing additive 81 and the melted portions of piece 44 adjacent to magnet 52D, piece 44 becomes fused to magnet 52D.

As further shown by FIG. 5, pieces 44 and 50 are welded together. In particular, the front face 64 of the closed cell foam layer of piece 44 is a welded to previously melted and presently solidified portions of a rear face 84 of piece 50. The rear face 84 of piece 50 is welded to the previously melted and presently solidified portions of front face 64 of the closed cell foam layer of piece 44. In the example illustrated, a welding additive 82 is provided between front face 64 of piece 44 and rear face 84 of piece 50. The welding additive comprises a melted material which is at a sufficiently high temperature to also melt the closed cell foam material of pieces 44 and 50. As a result, the welding additive 82 and the close cell foam materials mix. As a result, the juncture between pieces 44 and 50 is provided by a more integral structure comprising mixture of materials from piece 44, piece 50 and the welding additive 82. This structure, being stronger, is better able to withstand forces encountered on the front of garage door 22 such as wind and other outdoor elements.

According to one embodiment, pieces 44 and 50 are formed from a same closed cell foam material. Fusing additive 81 and welding additive 82 have a same base material as a base material of the closed cell foam materials forming pieces 44 and 46. As a result, the fusing additive 81 and the welding additive 82 are more effectively joined and integrated with the closed cell foam materials of pieces 44 and 50. According to one embodiment, each of the closed cell foam materials pieces 44 and 50, as well as the remaining closed cell foam layers of article 24 are each form from close cell ethylene vinyl acetate (CAS #24937-78-8) (also known as EVA foam, expanded rubber or foam rubber). In such embodiments, the EVA foam material is additionally resistant to ultra violet radiation. In other embodiments, the closed cell foam materials may be different or the fusing or welding additives 81, 82 may not have the same base material. In such embodiments, the fusing additive and/or the welding additive additionally have the same base material consisting of ethylene vinyl acetate (CAS #24937-78-8). In one embodiment, the fusing and welding additives comprise a mixture of EVA and other additives such as wax and resin. In one embodiment, the welding and fusing additives are provided by hot melt glue sticks.

Although FIG. 5 illustrates the fusing of magnet 52D to piece 44, in one embodiment, all other structures of article 24 that are fused together are also fused using fusing additive 81. In one embodiment, all structures that are described as being welded to one another are welded to one another using welding additive 82. In one embodiment, all of the layers of closed cell foam layer of article 24 are formed from EVA foam. In other embodiments, some of the junctures between layers or components of article 24 may be joined in other fashions. Some of closed cell foam layers may be formed from different close cell foam materials.

Figure 6:
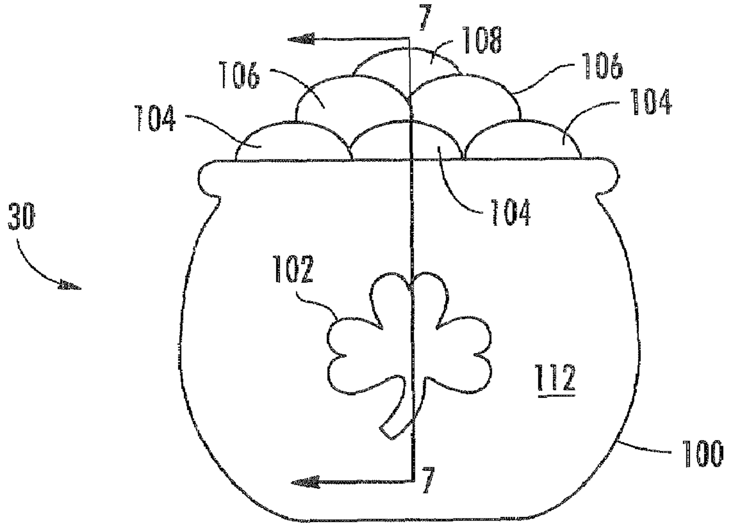
FIG. 6 is a front plan view of a second article of the display of FIG. 1 according to an example embodiment.
Figure 7:
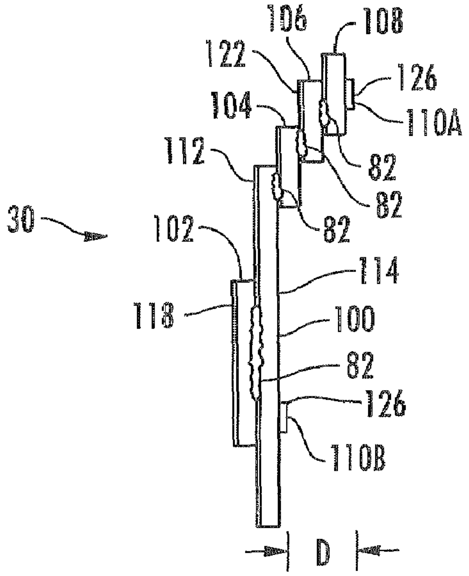
FIG. 7 is a sectional view of the article of FIG. 6 taken along line 7-7.

FIGS. 6 and 7 illustrate decorative article 30 in more detail. Decorative article 30 includes piece 100, piece 102, pieces 104, pieces 106, piece 108 and rare Earth metal magnets 110A and 110B (collectively referred to as magnets 110). Piece 100 comprises a layer of closed cell foam material having a front face 112, a rear face 114 and a thickness of at least 1/10 of an inch (nominally 1/8 of an inch). The layer of material forming piece one and 12 has a shape corresponding to the pot of article 30.

Piece 102 comprises a layer of closed cell foam material such as EVA foam. In the example illustrated, piece 102 includes a coating or laminate 118 of reflective or visually distinct material. Piece 102 is joined to front face 112 of piece 100. In the example illustrated, piece 102 is welded to front face 112 with welding additive 82 (described above). In other embodiment, piece 102 may be omitted.

Pieces 104-108 each comprise layers of closed cell foam material, such as EVA foam, having a front face, a rear face and a thickness of at least 1/10 of an inch (nominally 1/8 of an inch). Each of pieces 104-108 includes an additional coating or laminate 122 of a shiny, glittering or visually distinct material. Each of pieces 104-108 has a shape corresponding to a shape of a treasure, such as gold coins, such that article 30 represents a leprechaun's pot of gold.

As shown by FIG. 7, pieces 104-108 are stacked upon one another in a stack with respect to piece 112. As a result, pieces 104-108 provide article 30 with a multi-tier, multi-level article having four distinct layers that provide a visually discernible three-dimensional effect. The coins of the pot of gold appear stacked in a three-dimensional manner within the pot 100.

Magnets 110 are similar to magnets 52. Magnets 110A is fused to the rear face of piece 108. Magnet 110B is fused to rear face 114 of piece 100. As a result, those layers most distant apart from one another which extend opposite to surface 32 of garage door 22 are each provided with one of magnets 110 to securely hold article 30 against garage door 22. However, as shown by FIG. 7, the exposed faces of magnets 110A and 110B are spaced from one another in a direction substantially perpendicular to rear face 114 by distance D potential equal to the collective thickness of pieces 104-106. When article 30 is mounted to garage door 22, the closed cell foam layers 100 and 104-108 have a collective flexibility sufficient such article 24 bends enough that the exposed faces 126 of magnets 110 extend in a same plane against surface 32 of garage door 22. Unfortunately, this may place a great deal of stress at the junctures between each of such a layers. However, in the example illustrated, each of the stack of layers 100 and layers 104-108 are welded to one another using welding additive 82. As a result, pieces 100 and pieces

104-108 may provide a multi-level structure having at least three layers for a three dimensional effect while still being reliably held to one another and retained along to garage door 22 even when exposed to wind and other elements.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A garage door display comprising:

a decorative article comprising:

a closed cell foam layer having a thickness of at least 0.1 inches having a front face and a rear face;

a rare earth metal magnet fused to previously melted and presently solidified portions of the closed cell foam layer on the rear face; and a decorative piece fused to previously melted and presently solidified portions of the first closed cell foam layer on the front face.

2. The garage door display of claim 1, wherein the decorative piece comprises a second closed cell foam layer, wherein the second closed cell foam layer is welded to the closed cell foam layer at a location where the front face of the closed cell foam layer has been previously melted and is presently solidified and where a rear face of the second closed cell foam layer has been previously melted and is presently solidified.

3. The garage door display of claim 2 further comprising a third closed cell foam layer welded to the second closed cell foam layer at a second location where a front face of the second closed cell foam layer has been previously melted and is presently solidified and where a rear face of the third closed cell foam layer has been previously melted and is presently solidified.

4. The garage door display of claim 3 further comprising a fourth closed cell foam layer welded to the third closed cell foam layer at a third location where a front face of the third closed cell foam layer has been previously melted and is presently solidified and where a rear face of the fourth closed cell foam layer has been previously melted and is presently solidified.

5. The garage door display of claim 4 further comprising a second rare earth metal magnet fused to a previously melted and presently solidified portion of the rear face of the fourth closed cell foam layer spaced from the third location, wherein the closed cell foam layer, the second closed cell foam layer, the third closed cell foam layer and the fourth closed cell foam layer are collectively flexible such that the first rare earth metal magnet and the second rare earth metal magnet have magnet faces extending in a same plane when the decorative article is magnetically held against an opposing surface.

6. The garage door display of claim 3 further comprising a second rare earth metal magnet fused to a previously melted and presently solidified portion of the rear face of the second closed cell foam layer, wherein the closed cell foam layer and the second closed cell foam layer are collectively flexible such that the rare earth metal magnet and the second rare earth metal magnet have magnet faces extending in a same plane when the decorative article is magnetically held against an opposing surface.

7. The garage door display of claim 2 further comprising a welding additive in contact with the first closed cell foam layer and the second closed cell foam layer, wherein the first closed cell foam layer, the second closed cell foam layer and the welding additive each include a base material that is the same.

8. The garage door display of claim 7, wherein the base material comprises ethylene-vinyl acetate.

9. The garage door display of claim 1 further comprising a fusing additive between the closed cell foam layer and the rare earth metal magnet, wherein the fusing additive and the closed cell foam layer have a base material that is the same.

10. The garage door display of claim 9, wherein the base material comprises ethylene vinyl acetate.

11. The garage door display of claim 1, wherein the decorative piece comprises a second closed cell foam layer and wherein the closed cell foam layer and the second closed cell foam layer are part of a plurality of closed cell foam layers stacked upon one another to form a stack, wherein each of the plurality of closed cell phone layers is welded to an adjacent one of the plurality of closed cell foam layers; and a second rare metal magnet fused to one of the plurality of closed cell foam layers other than the closed cell foam layer, wherein the plurality of closed cell foam layers are flexible such that the rare earth metal magnet and the second rare earth metal magnet have magnet faces extending in a same plane when the decorative article is magnetically held against an opposing surface.

12. The garage door display of claim 1 further comprising a second decorative piece projecting beyond and cantilevered from the decorative piece.

13. The garage door display of claim 12, wherein the closed cell foam layer is formed from ethylene-vinyl acetate and wherein the second decorative piece is formed from a non-ethylene-vinyl acetate foam material.

14. The garage door display of claim 1, wherein the closed cell foam layer is formed from a material resistant to ultra violet radiation.

15. The garage door display of claim 1 further comprising a metallic garage door having a surface with depressions, the decorative article spanning the depressions.

16. The garage door display of claim 15 further comprising a second decorative article spaced from the decorative article on the surface.

17. The garage door display of claim 16 comprising at least four decorative articles, including the decorative article and the second decorative article, wherein the at least four decorative articles form a pattern on the surface.

18. The garage door display of claim 1, wherein the decorative article has a surface area of at least 20 square inches.

19. A decorative article comprising:

a closed cell foam layer having a thickness of at least 0.1 inches having a front face and a rear face;

a rare earth metal magnet fused to previously melted and presently solidified portions of the closed cell foam layer on the rear face; and a decorative piece fused to previously melted and presently solidified portions of the closed cell foam layer on the front face.

* * * * *